(No Model.)

H. W. McNEAL.
CALF WEANER.

No. 334,131. Patented Jan. 12, 1886.

WITNESSES

INVENTOR
Herbert W. McNeal

Attorneys,

UNITED STATES PATENT OFFICE.

HERBERT WILLARD McNEAL, OF FERNDALE, CALIFORNIA.

CALF-WEANER.

SPECIFICATION forming part of Letters Patent No. 334,131, dated January 12, 1886.

Application filed July 29, 1885. Serial No. 172,969. (No model.)

*To all whom it may concern:*

Be it known that I, HERBERT W. McNEAL, a citizen of the United States, residing at Ferndale, in the county of Humboldt and State of California, have invented new and useful Improvements in Calf-Weaners, of which the following is a specification, reference being had to the accompanying drawings.

My invention relates to an improvement in calf-weaners, designed to be secured in the nose of a calf, and provided with sharpened points that will prick the cow's udder on an attempt of the calf to suck its dam, and thereby cause her to prevent the calf from sucking; and it consists in the weaner formed from a single piece of wire and provided with a spring-clamp for securing the device to the cartilage between the nostrils, and with sharpened extending points, as will be more fully set forth hereinafter.

Figure 1:
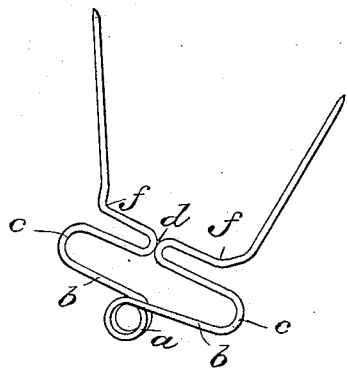
Figure 2:
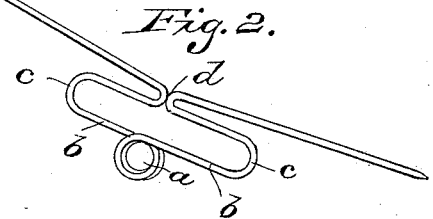
Figure 3:
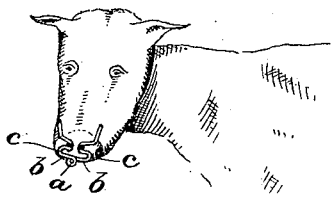

In the accompanying drawings, Figure 1 is a perspective view of a calf-weaner embodying my invention. Fig. 2 is a view of a modified form of the same. Fig. 3 shows the manner of applying the device.

My calf-weaner is formed of a single piece of wire, which may be made of either iron, brass, steel, or other suitable metal. The wire is first doubled and curved, so as to form the spring-coils $a$, from the upper side of which, in opposite directions, the arms of the wire extend, as at $b$. Curves $c$ are then formed therein, and the wire arms are bent to approach each other above the center of the spring-coils, to form the clamps $d$, which, by the action of the spring-coils, are pressed normally inwardly in contact with each other. From these clamps the arms are bent outwardly and upwardly, as at $f$, and are sharpened at the points, as shown.

The device is attached to the nose of the calf by spreading the arms apart against the tension of the spring-coils and slipping the clamps $d$ upon opposite sides of the cartilage between the nostrils, when the arms are released and the pressure of the spring-coils $a$ causes the clamps $d$ to come together and clamp the cartilage between them, and thus secure the device very firmly to the nose of the animal. The sharpened points project upwardly and forwardly beyond the nose, so as to prick the cow's udder upon the attempt of the calf to suck her.

Cows sometimes acquire the habit of sucking themselves or other cows, and to prevent this my device is readily adapted by bending the sharpened points straight outwardly from the clamps $d$ in opposite directions, as shown in Fig. 2.

A cow having this device attached to her nose can neither suck herself nor another cow.

A calf-weaner thus constructed is cheap and simple, is easily applied to the nose of the animal or taken therefrom, does not in any way interfere with the animal when eating, does not hurt the animal to which it is attached, and is a positive means for preventing it from sucking.

Having thus described my invention, I claim—

1. A calf-weaner bent from a single piece of wire and having the spring-clamps $d$ for bearing on opposite sides of the cartilage between the nostrils to secure the device to the nose of the animal, and having the extending sharpened points, substantially as described.

2. A calf-weaner formed from a single piece of wire, having the spring-coils $a$, the clamps $d$, and the extending sharpened points, substantially as described.

In testimony that I claim the foregoing as my own I have hereto affixed my signature in presence of two witnesses.

HERBERT WILLARD McNEAL.

Witnesses:
E. C. CUMMINGS,
D. VEROALIN.